(12) United States Patent
Couper et al.

(10) Patent No.: US 9,094,425 B2
(45) Date of Patent: Jul. 28, 2015

(54) ELECTRONIC MESSAGING BACKUP CATALOG

(75) Inventors: Christopher C. Couper, Shingle Springs, CA (US); Neil Katz, Parkland, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2419 days.

(21) Appl. No.: 11/101,131

(22) Filed: Apr. 7, 2005

(65) Prior Publication Data
US 2006/0230116 A1 Oct. 12, 2006

(51) Int. Cl.
*G06F 15/16* (2006.01)
*H04L 29/08* (2006.01)
*G06Q 10/10* (2012.01)
*H04L 12/58* (2006.01)

(52) U.S. Cl.
CPC .......... *H04L 67/1095* (2013.01); *G06Q 10/107* (2013.01); *H04L 51/08* (2013.01)

(58) Field of Classification Search
USPC ......................................................... 709/206
See application file for complete search history.

(56) References Cited

U.S. PATENT DOCUMENTS

| | | | |
|---|---|---|---|
| 5,710,883 A | 1/1998 | Hong et al. | |
| 6,029,164 A | 2/2000 | Birrell et al. | |
| 6,038,379 A * | 3/2000 | Fletcher et al. | 709/230 |
| 6,272,549 B1 | 8/2001 | Daniel | |
| 6,308,283 B1 * | 10/2001 | Galipeau et al. | 714/6 |
| 6,332,164 B1 | 12/2001 | Jain | |
| 6,442,686 B1 | 8/2002 | McArdle et al. | |
| 6,505,236 B1 * | 1/2003 | Pollack | 709/206 |
| 6,542,923 B2 | 4/2003 | Nguyen | |
| 6,684,239 B1 | 1/2004 | Flepp et al. | |
| 7,054,905 B1 * | 5/2006 | Hanna et al. | 709/206 |
| 7,257,639 B1 * | 8/2007 | Li et al. | 709/232 |
| 7,295,657 B1 * | 11/2007 | Keohane et al. | 379/88.23 |
| 7,509,326 B2 * | 3/2009 | Krabel et al. | 707/100 |
| 2001/0044910 A1 * | 11/2001 | Ricart et al. | 714/6 |
| 2003/0041112 A1 * | 2/2003 | Tada et al. | 709/206 |
| 2003/0135650 A1 * | 7/2003 | Kano et al. | 709/248 |
| 2004/0133645 A1 * | 7/2004 | Massanelli et al. | 709/206 |
| 2004/0230657 A1 * | 11/2004 | Tomkow | 709/206 |
| 2005/0003807 A1 * | 1/2005 | Rosenfelt et al. | 455/414.4 |
| 2005/0015721 A1 * | 1/2005 | Tsai | 715/513 |
| 2005/0050117 A1 * | 3/2005 | Seo et al. | 707/204 |
| 2005/0091324 A1 * | 4/2005 | Flocken | 709/206 |
| 2005/0102361 A1 * | 5/2005 | Winjum et al. | 709/206 |
| 2005/0114450 A1 * | 5/2005 | DeVos | 709/206 |
| 2006/0031309 A1 * | 2/2006 | Luoffo et al. | 709/206 |
| 2006/0149889 A1 * | 7/2006 | Sikha | 711/100 |

* cited by examiner

*Primary Examiner* — Shaq Taha
(74) *Attorney, Agent, or Firm* — Cuenot, Forsythe & Kim, LLC

(57) ABSTRACT

Within an electronic messaging system, a method of backing up data can include storing attributes for a plurality of message attachments exchanged through the electronic messaging system. Responsive to a request for a message attachment from a requestor, the request can be compared with attributes of the plurality of message attachments to select at least one message attachment matching the request. The method further can include determining whether the requested message attachment is available within the electronic messaging system and performing a programmatic action according to at least the determining step.

20 Claims, 2 Drawing Sheets

ELECTRONIC MESSAGING BACKUP CATALOG

BACKGROUND

1. Field of the Invention

The present invention relates to data retrieval and, more particularly, to retrieving data that has been sent using an electronic messaging system.

2. Description of the Related Art

Modern computer systems store vast amounts of data, whether on a single machine, or within a network of multiple, interconnected machines. For many individuals and businesses alike, this data is critical to day-to-day operations. Hence, safely maintaining and/or storing this data is a priority.

One way of properly maintaining data is to perform routine data backups. Routine backups ensure that data that is lost can be recovered easily or with minimal effort. Typically, data is backed up to an "off device" medium. That is, data is backed up to a medium that is independent of the medium upon which the data was originally stored. For example, data can be backed up and stored on a different computer system, an optical storage medium such as a CD or DVD, a magnetic storage medium, or the like.

Frequently, however, routine data backups are not performed, or are performed sporadically. The reasons for failing to backup data on a regular basis, or at all, can be varied. For example, data may not be backed up due to lack of storage capacity, lack of network bandwidth, or lack of time on the part of the user. Still another common reason is that some users simply lack the knowledge or skill set necessary to perform a data backup.

It would be beneficial to provide a more autonomous technique for backing up data which overcomes the obstacles described herein.

SUMMARY OF THE INVENTION

The present invention provides a solution for backing up data. One embodiment of the present invention can include a computer-implemented method of backing up data within, or using, an electronic messaging system. The method can include storing attributes for a plurality of files sent as attachments to messages exchanged among a plurality of users through the electronic messaging system. Responsive to a request for a file attachment from a requester received by the messaging system, the request can be compared with the attributes of for the plurality of files sent as attachments to select at least one attachment matching the request. The method further can include determining whether the requested file is stored within the electronic messaging system according to whether the request matches the attributes of at least one of the plurality of files and notifying the requestor of the availability of the requested file according to the determining step.

The attributes of the plurality of files sent as attachments can be stored in one or more messaging servers, messaging clients, or any combination thereof. In one embodiment, the attributes of the plurality of files sent as attachments can include a copy of at least one of the plurality of files. Still, the attributes of the plurality of files sent as attachments can include additional information including, but not limited to, a filename, a version, a size, a date, and/or any combination thereof.

If the requested file is available within the electronic messaging system, the requested file can be provided to the requester. If, however, the requested file is not available within the electronic messaging system and the attributes specify recipients of the plurality of files sent as attachments, one or more recipients of the requested file can be identified. Any recipients can be queried to determine whether the recipient(s) have a copy of the requested file. While recipients can respond manually, in another aspect of the present invention, responsive to the querying step, a computer system associated with the recipient can respond autonomously.

In the case where two or more of the plurality of files sent as attachments match the request, the method can include sending to the requestor a list of files sent as message matching the request and receiving a selection of at least one of the files from the list.

Other embodiments of the present invention can include a machine readable storage being programmed to cause a machine to perform the various steps described herein as well as a system having means for performing the steps disclosed herein.

BRIEF DESCRIPTION OF THE DRAWINGS

There are shown in the drawings, embodiments which are presently preferred; it being understood, however, that the invention is not limited to the precise arrangements and instrumentalities shown.

DETAILED DESCRIPTION OF THE INVENTION

The present invention provides a solution for backing up data in a communications network. More particularly, through the use of an electronic messaging system, files attached to messages exchanged over the communications network can be backed up. In accordance with the inventive arrangements disclosed herein, files attached to messages exchanged over the communications network can be cataloged by the electronic messaging system. Subsequently, when a user wishes to retrieve such a file, the user can request the file from the messaging system. If the file is available from the messaging system, the file can be returned to the requester. If not available, the electronic messaging system can query recipients of the message to which the requested file was attached to determine whether any of the recipients has a copy of the file.

Figure 1:
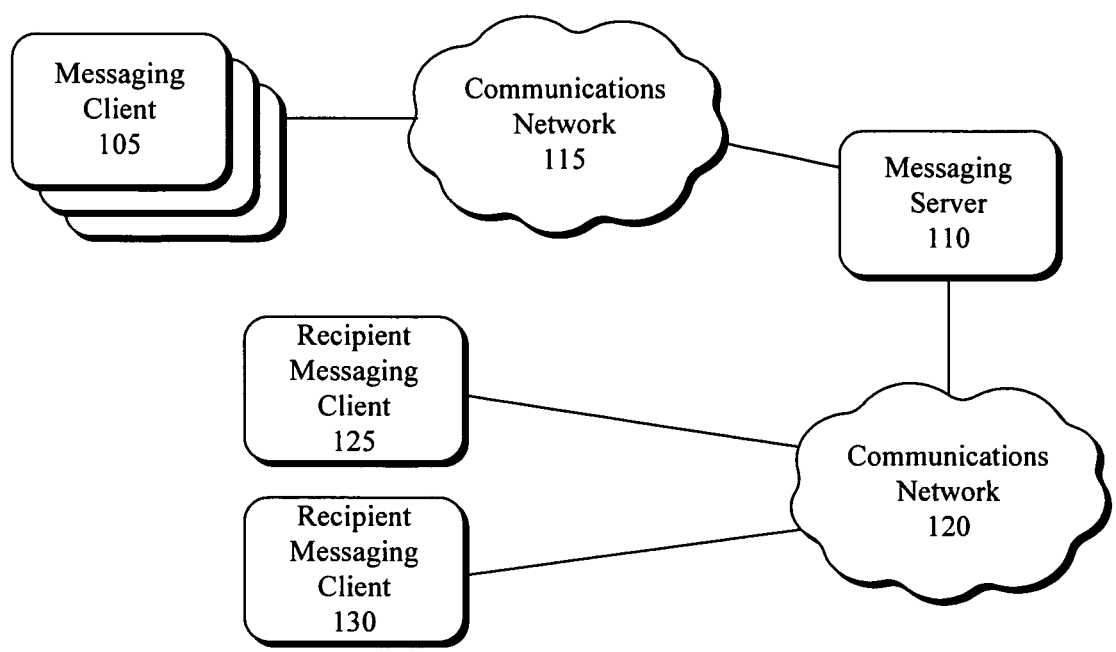
FIG. 1 is a schematic diagram illustrating an electronic messaging system configured in accordance with one embodiment of the present invention.

FIG. 1 is a schematic diagram illustrating an electronic messaging system (messaging system) 100 configured in accordance with one embodiment of the present invention. As shown, messaging system 100 can include one or more messaging clients 105 and a messaging server 110. The messaging clients 105 and the messaging server 110 can be communicatively linked via a communications network 115. Further, the messaging server 110 can be communicatively linked to one or more other recipient messaging clients 125 and 130 via communications network 120.

The messaging clients 105, messaging server 110, and recipient messaging clients 125 and 130 can be implemented as one or more computer programs executing within suitable information processing systems. In illustration, each of the messaging clients 105 and recipient messaging clients 125 and 130 can be implemented as electronic mail (email) client and/or instant messaging client. Similarly, the messaging server 110 can be implemented as an email and/or instant messaging server as the case may be.

In another aspect, the present invention can be implemented using one or more computer programs, such as agents, daemons, or the like, which can be configured to work autonomously and independently, or in conjunction with, messaging clients 105, the messaging server 110, and/or the recipient messaging clients 125 and 130. Thus, the terms "messaging client" and "messaging server", as used herein, are intended to refer to any single program or plurality of programs capable of performing the functions described herein. The communications networks 115 and 120 can be implemented as one or more wide area networks, local area networks, wireless networks including cellular, mobile, and/or other short range data networks, the Internet, and the like, including combinations thereof.

The messaging clients 105, the messaging server 110, and the recipient messaging clients 125 and 130 can be configured for sending and receiving electronic messages such as email messages and/or instant messages. As is known, one or more electronic files can be attached to the messages sent over the communications networks 115 and 120 through the messaging system 100. The electronic files can be text files, audio files, video files, audiovisual and/or other types of multimedia files, etc. The particular type of file sent as an attachment is not intended as a limitation of the present invention.

In one embodiment of the present invention, the messaging server 110 can be configured to include an additional layer responsible for cataloging each file that is sent or received over the communications network as a message attachment via the messaging system 100. Attributes relating to each attached file can be stored within the messaging system 100, i.e. in the messaging server 110, the messaging clients 105, and/or the recipient messaging clients 125 and 130 for later use.

The attributes can be stored within the messaging server 110 as a catalog or digest detailing files sent through the messaging system 100. The catalog can be arranged as a series of entries, with each entry corresponding to a particular file attachment. Each catalog entry can specify attributes defining a file attachment. It should be appreciated, however, that the present invention is not to be limited to the use of a particular data structure for the catalog as any of a variety of different data structures can be used.

In illustration, attributes pertaining to the attached file can include, but are not limited to, the filename of the attachment, the size of the attachment, the date of the attachment, and the date the attachment was sent and/or received. Any metadata relating to the attached file also can be stored within the catalog. In one embodiment, the attributes can include a copy of the actual attachment and/or message to which the file was attached, either of which can be stored within the messaging system 100 as part of the catalog or digest.

In another embodiment, attributes can include portions of text, i.e. text extracted and/or indexed, from the file attachment and/or the message to which the file was attached. Still other attributes can relate to the electronic message to which the file was attached. Such attributes can include, but are not limited to, the sender of the message, the message recipients, the subject of the message, any other parties that were carbon copied and/or blind copied, as well as the time the message was sent and/or received.

While the messaging server 110 can be configured as described above, in another embodiment, the messaging clients 105 can be so configured and include a digest. Thus, while the messaging server 110 can perform cataloging functions for a plurality of users, each messaging client 105 can perform cataloging functions for any messages and/or attachments sent and/or received to or from that particular messaging client. In yet another embodiment, the recipient messaging clients 125 and 130 can be configured to perform the cataloging functions described herein and include catalogs. Thus, depending upon whether the catalog is stored within the messaging clients 105, the messaging server 110, or the recipient messaging clients 125 and 130, or a combination thereof, the catalog can be stored in a single centralized location or distributed among the various clients and server(s) with cataloging functions shared in accordance with the distribution of the catalog.

By storing attributes as described, a catalog is maintained within the messaging system 100. When a user, referred to as a requestor, is in need of a file that may no longer be available to the user, the requestor can query the messaging system 100 via the messaging client 105 in an attempt to recover the file. As the messaging system 100 can store attributes of messages and/or attachments, if the file was sent through the messaging system 100, the messaging system 100 may have a copy of the requested file stored therein.

Alternatively, the messaging system 100 can determine the recipients of the requested file based upon stored attributes. That is, the messaging system 100 can determine the recipients of the message to which the requested file was attached and query the recipients to determine whether any of the recipients have a copy of the requested file.

As noted, recipient messaging clients 125 and 130 can be configured with cataloging functions as described herein as well as automated agents, daemons, or other software components, that allow the messaging clients to respond automatically to such queries. The recipient messaging clients 125 and 130 can perform autonomous search and retrieval operations and forward results to the requestor or to the messaging system 100. In another embodiment, queries for files from the messaging system 100 can be sent as conventional messages that are read by recipients at recipient messaging clients 125 and 130 such that the recipients must take some affirmative action to respond, locate, and/or send a requested file back to the messaging system 100 and/or the requester, i.e. one of the messaging clients 105.

It should be appreciated that system 100 depicted in FIG. 1 was used for purposes of illustration only. The present invention can be scaled larger or smaller according to the size of the messaging system used, with more or fewer messaging clients and/or messaging servers as the case may be. As such, the present invention is not limited to the configuration illustrated in FIG. 1.

Figure 2:
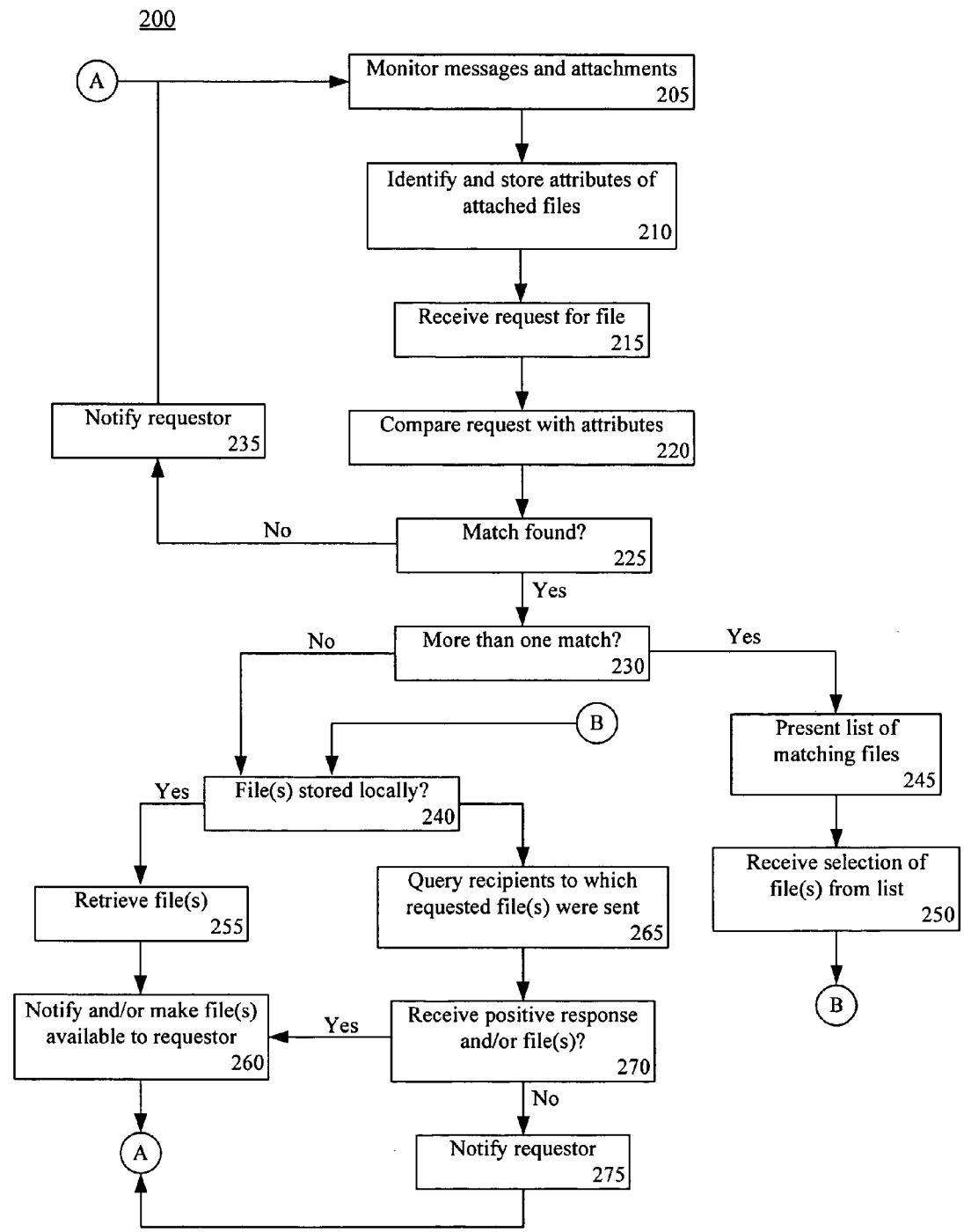
FIG. 2 is a flow chart illustrating a method of backing up data through the use of an electronic messaging system in accordance with the inventive arrangements disclosed herein.

FIG. 2 is a flow chart illustrating a method 200 of backing up data through the use of a messaging system in accordance with the inventive arrangements disclosed herein. The method 200 can be performed by a messaging system, such as the messaging system described with reference to FIG. 1. The various steps disclosed herein can be performed by a messaging server, i.e. a centralized server, or within one or more interconnected messaging clients, or within both a messaging server and messaging clients.

The method 200 can begin in step 205 where messages and/or attachments to messages sent through the messaging system are monitored. In step 210, attributes of the attachments to messages can be identified and stored within a catalog of such information. It should be appreciated that while step 205 and step 210 are depicted as being single, discrete steps, each can be performed in an ongoing basis. That is, the messaging system can continually monitor incoming and outgoing messages and attachments to perform the cataloging functions described herein.

As noted, an attribute can include, but is not limited to, the filename of an attachment, the size of an attachment, the date the attachment was created, the date the attachment was sent and/or received, the sender of the message to which the attachment was attached, a message recipient, the subject of the message, as well as any other party that was carbon copied and/or blind copied. An attribute also can specify information about the message to which the file was attached such as the time the message was sent and/or received. Further, an attribute can include a copy of the attachment and/or message itself, portions of text, and/or metadata.

In step 215, the messaging system can receive a request to retrieve a file. A user that no longer has access to a file, believing that the file was at one time sent as an attachment to a message can initiate such a query. Depending upon the implementation of the messaging system, the query can be directed to the requestor's messaging client, the messaging server, or both. The query can be initiated through the messaging client. The request can specify particular attributes or ranges of attributes described herein which can be used to search the catalog of attributes.

In step 220, the messaging system can compare the attributes specified by the request with the catalog of attributes. If a match is found in step 225, the method can proceed to step 230. If not, the method can continue to step 235, where the requestor can be notified that the request does not match any attributes. If the messaging client performs such a comparison, the messaging client can notify the user. If the messaging server performs the comparison, a notification can be sent from the messaging server to the messaging client. After providing notification, the method can loop back to step 205 to repeat as may be required.

Continuing with step 230, in the case where a match was found, a determination can be made as to whether more than one matching entry in the catalog was found. If so the method can proceed to step 245 where a list of matching files, or information specifying the files, as specified in the catalog entries can be presented. A selection of one or more files from the list, as specified by the requestor, can be received in step 250.

In step 240, a determination can be made as to whether the requested file is stored locally within the messaging system. That is, if the messaging server is queried, the messaging server can determine whether the requested file has been stored therein. If the messaging client is queried, the messaging client can determine whether the file has been stored therein. Alternatively, both the messaging client and messaging server can search for the requested file and make such a determination. If the requested file is stored, or available, within the messaging system, the method can proceed to step 255. If not, the method can proceed to step 265.

In step 255, in the case where a copy of the requested file was found in the messaging system, the file can be retrieved. In step 260, the requestor can be notified that the file was located within the messaging system. Further, the file can be sent, forwarded, or otherwise made available to the requestor. After step 260, the method can proceed to step 205 to repeat as may be required.

In step 265, in the case where the requested file was not located on the messaging system, the messaging system can query recipients of the requested file. As noted, the messaging system maintains a listing of the recipients of each attachment that has passed through the system. Accordingly, the messaging system can recall the particular recipients to which the requested file was sent. Those recipients can be queried to determine whether any of the recipients has a copy of the requested file.

In one embodiment of the present invention, the messaging system can be configured to send conventional messages such as emails and/or instant messages to the recipients. In that case, the recipients can respond directly to the requester, which can be specified in the query from the messaging system, or can respond to the messaging system. The messaging system can be configured to parse a received message to automatically discern a negative response, a positive response, or obtain an attached file sent from the recipient and make that file available to the requester. For example, the messaging system can send a new message with the requested file attached thereto or forward the message received from the recipient.

In another embodiment, the recipient system can be configured to function much in the same way as already described, with the exception being that the recipient system can function in an autonomous manner. In that case no intervention on the part of the recipient would be required. The recipient messaging system can be configured to respond automatically and autonomously to undertake a search for the requested file similar to the way in which the messaging system performs the search. That is, the recipient client can maintain a catalog of received and sent attachments as described herein. This functionality can be implemented directly into the recipient messaging system or can be included in an agent or daemon which can execute on the recipient system.

In still another embodiment, if the requested file is not stored in the messaging system, the messaging system can determine whether the file is stored on a server backup dataset. In that case, the messaging system can queue a request to a system administrator to return the file to the user. The user can be notified of the possible file recovery based on the backup set.

In step 270, the messaging system can determine whether a response was received from one or more of the recipients. Further, if one or more response is received, the messaging system can determine whether the responses are negative or positive, and whether the responses include the requested file as an attachment. If the file is sent from the recipient to the messaging system, or the response is positive, the method can proceed to step 260, where the requested file can be made available to the requestor in one form or another. Alternatively, the requestor can be informed of the recipient that has a copy of the requested file. After step 260, the method can repeat as necessary.

If no response is received from the recipients, or the response is negative, the method can continue to step 275. In step 275, the requestor can be notified that a copy of the files cannot be located. After step 275, the method can loop back to step 205 to continue processing as may be required.

When requested files are returned by the messaging system or by a recipient of the message to which the requested file was attached, the returned file can be compared with the message digest created by the messaging system. The comparison can be used to verify that the returned file is the actual file requested by the requestor. Further, such a comparison can be used to ensure that the file that was returned has not been modified or corrupted as compared to the version that was originally sent as an attachment.

While the method has been described in reference to the retrieval of a single file, it should be appreciated that more than one file can be located using the present invention. That is, requests for the retrieval of more than one file can be submitted to the messaging system or a requestor can select more than one file from the list in the case where the messaging system determines more than one match to the requestor's request.

The present invention takes advantage of electronic messaging system usage to catalog and recover files that may have been lost to users. In accordance with the inventive arrangements, files sent with messages through an electronic messaging system can be cataloged. When a user wishes to attempt to recover a lost file, the user can search the messaging system, i.e. either messaging client(s) and/or messaging server(s). Any matched files can be returned, or a listing of matched files can be returned. The requesting user can select one or more files to be retrieved.

If the file(s) are stored in the messaging system, the files can be retrieved for the requesting user. If the files are not immediately available, the messaging system can send a message to each of the original message recipients asking the recipient to return the file to the originator or can cause a request to a backup system to be queued.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program, software application, or other variations of these terms, in the present context, means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. Within an electronic messaging system, a computer-implemented method of backing up data comprising:
receiving, within a messaging server, messages from at least one sender messaging client, wherein each message is to be sent to at least one recipient messaging client, and wherein selected ones of the messages comprise a file as an attachment to the message;
storing, within the messaging server, attributes for the files sent as attachments to messages exchanged among the at least one sender messaging client and the at least one recipient messaging client;
responsive to a request for a file from a requestor messaging client, comparing the request with the attributes for the files sent as attachments to messages;
determining whether the requested file has been sent as an attachment to a message by the messaging server according to whether the request matches the attributes of files sent as attachments to messages;
identifying at least one recipient messaging client that received a message having the requested file as an attachment according to the attributes of files sent as attachments;
querying the at least one recipient messaging client to determine whether the at least one recipient messaging client is storing a copy of the requested file;
when the at least one recipient messaging client is storing a copy of the requested file, determining whether the requested file is available to the requestor messaging client from the recipient messaging client; and
notifying the requestor messaging client of the determined availability of the requested file.

2. The method of claim 1, further comprising:
determining that the requested file has been sent as an attachment to a message;
determining whether a copy of the requested file is stored within the messaging server; and
when a copy of the requested file is stored within the messaging server, providing a copy of the requested file from the messaging server to the requestor messaging client.

3. The method of claim 1, wherein, responsive to said querying step, the recipient messaging client responds autonomously, without user intervention.

4. The method of claim 1, wherein at least two of the plurality of files sent as attachments match the request, said method further comprising:
sending to the requestor messaging client a list of files sent as attachments matching the request; and
receiving a selection of at least one of the files from the list.

5. The method of claim 2, wherein identifying at least one recipient messaging client is responsive to determining that the copy of the requested file is not stored within the messaging server.

6. The method of claim 1, wherein the electronic messaging system is an electronic mail system and the messages are electronic mail messages or instant messages.

7. A machine readable storage device, having stored thereon a computer program having a plurality of code sections executable by a machine for causing the machine to perform the steps of:
receiving, within a messaging server, messages from at least one sender messaging client, wherein each message is to be sent to at least one recipient messaging client, and wherein selected ones of the messages comprise a file as an attachment to the message;
storing, within the messaging server, attributes for the files sent as attachments to messages exchanged among the at least one sender messaging client and the at least one recipient messaging client;
responsive to a request for a file from a requestor messaging client, comparing the request with the attributes for the files sent as attachments to messages;
determining whether the requested file has been sent as an attachment to a message by the messaging server according to whether the request matches the attributes of files sent as attachments to messages;
identifying at least one recipient messaging client that received a message having the requested file as an attachment according to the attributes of files sent as attachments;
querying the at least one recipient messaging client to determine whether the at least one recipient messaging client is storing a copy of the requested file;
when the at least one recipient messaging client is storing a copy of the requested file, determining whether the requested file is available to the requestor messaging client from the recipient messaging client; and notifying the requestor messaging client of the determined availability of the requested file, wherein the machine readable storage device is not a transitory, propagating signal per se.

8. The machine readable storage device of claim 7, further comprising:

determining that the requested file has been sent as an attachment to a message;

determining whether a copy of the requested file is stored within the messaging server; and when a copy of the requested file is stored within the messaging server, providing a copy of the requested file from the messaging server to the requestor messaging client.

9. The machine readable storage device of claim 7, wherein, responsive to said querying step, the recipient messaging client responds autonomously, without user intervention.

10. The machine readable storage device of claim 7, wherein at least two of the plurality of files sent as attachments match the request, said method further comprising:

sending to the requestor messaging client a list of files sent as attachments matching the request; and receiving a selection of at least one of the files from the list.

11. The machine readable storage device of claim 8, wherein identifying at least one recipient messaging client is responsive to determining that the copy of the requested file is not stored within the messaging server.

12. An electronic messaging system configured to backup data, said system comprising:

at least one hardware processor, wherein the at least one hardware processor is configured to perform:

receiving, within a messaging server, messages from at least one sender messaging client, wherein each message is to be sent to at least one recipient messaging client, and wherein selected ones of the messages comprise a file as an attachment to the message;

storing, within the messaging server, attributes for the files sent as attachments to messages exchanged among the at least one sender messaging client and the at least one recipient messaging client;

responsive to a request for a file from a requestor messaging client, comparing the request with the attributes for the files sent as attachments to messages;

determining whether the requested file has been sent as an attachment to a message by the messaging server according to whether the request matches the attributes of files sent as attachments to messages;

identifying at least one recipient messaging client that received a message having the requested file as an attachment according to the attributes of files sent as attachments;

querying the at least one recipient messaging client to determine whether the at least one recipient messaging client is storing a copy of the requested file;

when the at least one recipient messaging client is storing a copy of the requested file, determining whether the requested file is available to the requestor messaging client from the recipient messaging client; and notifying the requestor messaging client of the determined availability of the requested file.

13. The system of claim 12, wherein the at least one hardware processor is further configured to perform:

determining that the requested file has been sent as an attachment to a message;

determining whether a copy of the requested file is stored within the messaging server; and providing a copy of the requested file from the messaging server to the requestor messaging client operable when a copy of the requested file is stored within the messaging server.

14. The system of claim 12, wherein at least two of the plurality of files sent as attachments match the request, and the at least one hardware processor is further configured to perform:

sending to the requestor messaging client a list of files sent as attachments matching the request; and receiving a selection of at least one of the files from the list.

15. The method of claim 1, wherein querying the at least one recipient messaging client to determine whether the at least one recipient messaging client is storing a copy of the requested file comprises sending a query to the at least one recipient messaging client from the messaging server.

16. The method of claim 1, further comprising:

determining whether the requested file is located on the messaging server;

wherein the at least one messaging client is identified and queried responsive to first determining that the requested file is not located on the messaging server.

17. The machine readable storage device of claim 7, wherein querying the at least one recipient messaging client to determine whether the at least one recipient messaging client is storing a copy of the requested file comprises sending a query to the at least one recipient messaging client from the messaging server.

18. The machine readable storage device of claim 7, said method further comprising:

determining whether the requested file is located on the messaging server;

wherein the at least one messaging client is identified and queried responsive to first determining that the requested file is not located on the messaging server.

19. The system of claim 12, wherein querying the at least one recipient messaging client to determine whether the at least one recipient messaging client is storing a copy of the requested file comprises sending a query to the at least one recipient messaging client from the messaging server.

20. The system of claim 12, wherein the at least one hardware processor is further configured to perform:

determining whether the requested file is located on the messaging server; and the at least one messaging client is identified and queried responsive to first determining that the requested file is not located on the messaging server.

* * * * *